UNITED STATES PATENT OFFICE 2,519,427

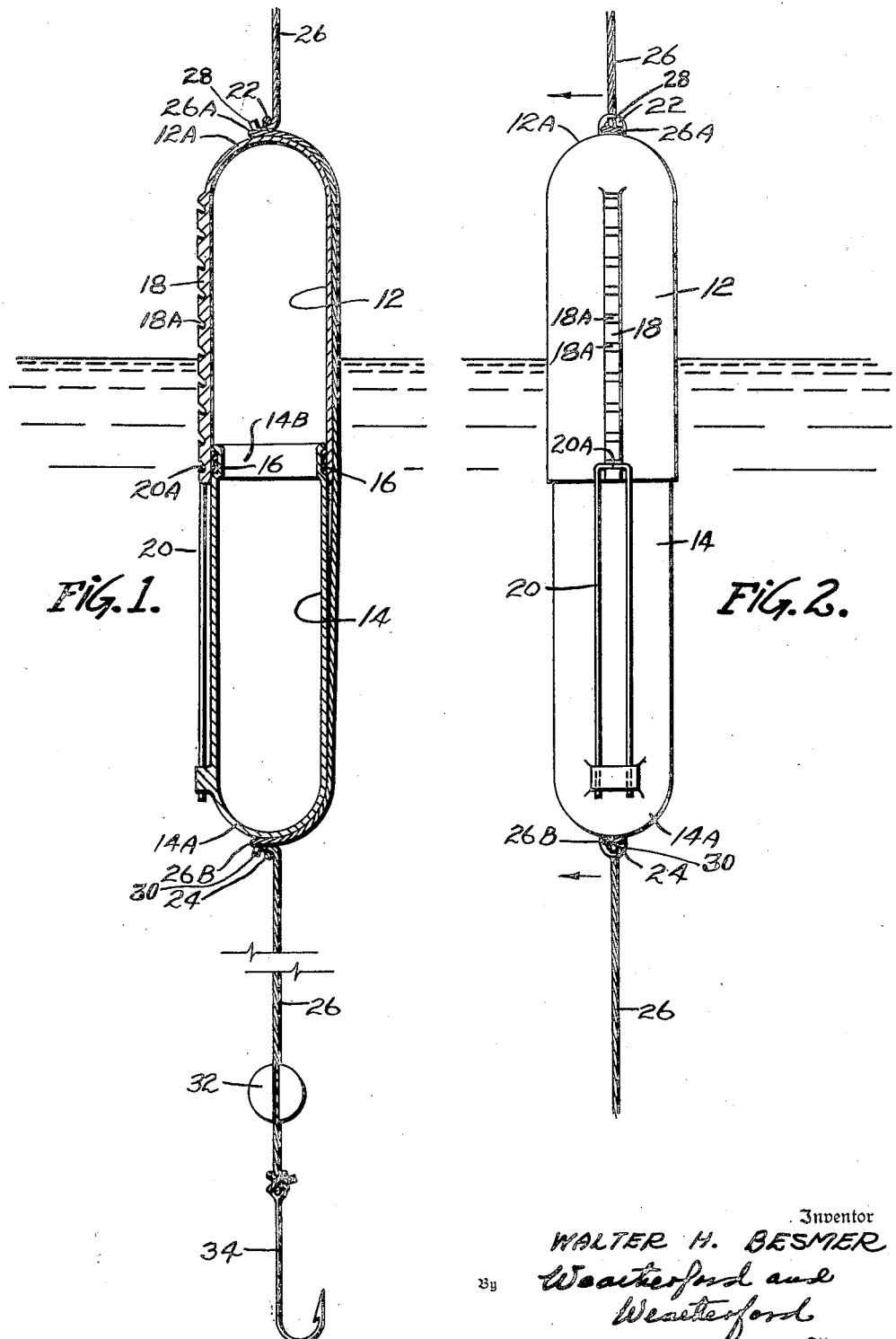

FISHING FLOAT

Walter H. Besmer, Memphis, Tenn.

Application July 8, 1949, Serial No. 103,614

1 Claim. (Cl. 43—43.14)

This invention relates to improvements in floats used by fishermen, and has particular reference to a float which is adjustable in volume to conform to the weight of the sinker and hook, to the habits of the fish and the whims of the angler.

Still fishing is done in deep or in shallow water, but in either the sinker and hook are ordinarily supported below the water surface and above the bottom by a float, which is held upright by the weight of the sinker and hook so long as they are above the bottom of the body of water, but lies on the surface if they rest on the bottom. Some fish nibble and a sensitive float is needed, others strike and for these a larger volume float is advisable.

The size of the hook varies with the type and size of fish; and in this type of fishing, the weight of the sinker varies with the condition of the water, whether still or running; and the response of the float to the manner in which the fish bites or strikes, and these in turn are interpreted through the whim of the fisherman as to the amount of resistance and sensitivity he desires in a float.

The objects of the present invention are:

To provide a float which may be easily adjusted over a considerable range of volume and which, when adjusted, will retain its adjustment until again changed.

To provide an adjustable float which will retain its adjustment under the strain of use.

To provide simple and efficient means for securing the adjustable parts of the float against separation; and To provide a simple, efficient and inexpensive adjustable float.

The means by which the foregoing and other objects of the present invention are accomplished and the manner of their accomplishment will readily be understood from the following specification on reference to the accompanying drawings, in which:

Fig. 1 is a sectional front elevational view of the float taken on the longitudinal center line.

Fig. 2 is a corresponding side elevational view of the float.

Referring now to the drawings in which the various parts are indicated by numerals, the float comprises two cylindrical parts or halves 12, 14, each having one closed end 12A, 14A respectively, and their opposite ends open, these parts preferably being made of Celluloid or other type of plastic material.

The half 14 is smaller than the half 12 and the open end of the half 14 is telescoped within the open end of the half 12. The half 14 terminates at its open end in an annularly grooved portion 14B in which is disposed a packing ring 16 which may be of soft rubber or other material adapted to make a water, and substantially airtight slip jointed with the inner surface of the half 12.

Secured to, or integral with, the outer half 12 is a strip 18 extending longitudinally from the open end 12A substantially to the closed end of the half, the strip being provided with notches 18A. Secured to the inner half 14 adjacent its closed end is a latch member 20, here shown as two parallel rod-like parts, which is spaced radially from the shell of the half 14 substantially the thickness of the shell of the half 12, and extends substantially to the open end of the half to which it is attached and there terminates in a transverse portion 20A which is adapted for engagement with any one of the notches 18A, by such engagement anchoring the halves together against displacement. The latch member is preferably resilient and its latch engaging portion 20A is sprung outward to disengage it from notch engagement.

The closed ends of the halves respectively have upwardly and downwardly extending eyes 22, 24, through which loops 26A, 26B of the fishing line 26 may be passed. These ends are also provided with pins 28, 30 over which the loops 26A and 26B may respectively be engaged, this loop engagement of the line to the ends of the halves effecting secure engagement of the line to the float and also, as does the latch member, secures the halves against separation. 32 is a weight or sinker on the line and 34 the fish hook.

For use, the halves of the float are pushed together, the latch member 20A is engaged with a notch 18A and the line 26 adjusted for the selected fishing depth and a line loop, as the loop 26A, formed and passed through the eye 22, engaged over the pin 28, the line is then drawn taut along the side of the float opposite the latch side and the loop 26B formed and passed through the eye 24, engaged over the pin 30 and adjusted to insure that there is no looseness or slack of the line between the attachment points.

The line may now be tested in the water and if the float stands too high, it is shortened, or if too low, it is lengthened until the proper adjustment is reached.

It will be understood that when the half 14 is inserted in the half 12, air is trapped and as the halves are telescoped that this trapped air is compressed and this air on hot days in the sun, is greatly expanded. Though some air may escape there is usually sufficient pressure, either hot or cold, to obviate the necessity of any other means to urge the separation of the halves and holding by the bill on the latch is necessary. Both however, are needed to provide a balanced holding and obviate distortion.

It will further be noted that the pull of the line, though it is attached to both ends of the float, is substantially directly to the hook.

Once adjusted, it is usually unnecessary to make further change unless change in conditions so indicate, in which case the adjustment can quickly and easily be made.

It will be understood that the float can be made in various sizes, either as to diameter or length or both.

I claim:

A fishline float comprising elongated, longitudinally telescoping hollow halves both open at their telescoping ends and closed at their outer ends, means for establishing a water tight joint between said halves and means for anchoring said halves against separation at various positions of adjustment, said means including a notched member, secured longitudinally along the outer of said halves, and a cooperating latch member secured adjacent the closed end of the inner said half and extending substantially to the open end thereof, said latch member having at the latter said end a notch engaging portion.

WALTER H. BESMER.

REFERENCES CITED

The following references are of record in the file of this patent:

UNITED STATES PATENTS

| Number | Name | Date |
|---|---|---|
| 12,060 | Hoard | Dec. 12, 1854 |

FOREIGN PATENTS

| Number | Country | Date |
|---|---|---|
| 20,443 | Great Britain | Nov. 24, 1891 |
| 715,795 | France | Dec. 9, 1931 |